United States Patent [19]

Norton et al.

[11] 4,343,363

[45] Aug. 10, 1982

[54] PROCESS FOR CLEANING A SUBTERRANEAN INJECTION SURFACE AND FOR SELECTIVELY REDUCING THE PERMEABILITY OF A SUBTERRANEAN FORMATION

[75] Inventors: Charles J. Norton; David O. Falk, both of Denver, Colo.

[73] Assignee: Marathon Oil Company, Findlay, Ohio

[21] Appl. No.: 221,966

[22] Filed: Jan. 2, 1981

[51] Int. Cl.$^3$ .................. E21B 33/138; E21B 43/22
[52] U.S. Cl. ............................ 166/281; 166/288; 166/295; 166/300
[58] Field of Search ........... 166/270, 281, 294, 295, 166/300, 271, 307

[56] References Cited

U.S. PATENT DOCUMENTS

| | | | |
|---|---|---|---|
| 2,604,172 | 7/1952 | Wrightsmann | 166/281 |
| 3,528,503 | 9/1970 | Crowe | 166/300 |
| 3,658,129 | 4/1972 | Lanning et al. | 166/270 |
| 3,704,750 | 12/1972 | Miles et al. | 166/300 X |
| 3,757,863 | 9/1973 | Clampitt et al. | 166/270 X |
| 3,768,561 | 10/1973 | Tate | 166/281 |
| 3,782,467 | 1/1974 | Hessert | 166/261 |
| 3,785,437 | 1/1974 | Clampitt et al. | 166/281 |
| 3,958,638 | 5/1976 | Johnston | 166/294 |
| 4,039,029 | 8/1977 | Gall | 166/270 X |
| 4,120,361 | 10/1978 | Threlkeld | 166/270 X |

*Primary Examiner*—Stephen J. Novosad
*Assistant Examiner*—George A. Suchfield
*Attorney, Agent, or Firm*—Jack L. Hummel

[57] ABSTRACT

A process for selectively reducing the permeability of a subterranean formation penetrated by a well bore and having an injection surface plugged by crosslinked dry polymer. The process comprises the sequential injection of an aqueous solution containing an oxidizing agent, an aqueous spacer medium, and an aqueous solution having at least one dry polymer dissolved therein. Sequential injection of these aqueous solutions can be repeated to achieve the desired degree of injectivity and permeability reduction.

14 Claims, No Drawings

4,343,363

PROCESS FOR CLEANING A SUBTERRANEAN INJECTION SURFACE AND FOR SELECTIVELY REDUCING THE PERMEABILITY OF A SUBTERRANEAN FORMATION

DESCRIPTION

1. Technical Field

The present invention relates to a process for cleaning a subterranean injection surface and for selectively reducing the permeability of a subterranean formation, and more particularly, to a process for removing a face plug formed on an injection surface of a well bore penetrating a subterranean formation and in fluid communication therewith and for selectively reducing the permeability of relatively highly permeable zones of the formation to improve vertical and areal conformance and flow profiles of fluids injected or produced therefrom.

2. Background Art

In general, poor vertical or areal conformance of fluids injected into or produced from a subterranean formation occurs where the formation exhibits a lack of vertical or volumetric homogeneity. Fluid injected into or produced from a well penetrating the formation tends to preferentially channel or finger into areas of relatively high permeability, thus resulting in extremely poor vertical and areal conformance and flow profiles. Further exemplary, relatively highly permeable zones, strata, beds, channels, vugs, or fractures, may be vertically juxtaposed to zones, strata, or beds of relatively low permeability at the subterranean location where fluids are to be injected or produced via a well bore. Fluids injected into or produced from the subterranean hydrocarbon-bearing formation will preferentially flow through the zones, strata, channels, vugs or fractures of relatively high permeability resulting in a relatively high residual hydrocarbon content in the remaining zones, strata, or beds of relatively low permeability.

Several processes have been proposed to alleviate such preferential channeling or fingering, and thus, improve conformance and injection and/or production flow profiles. High molecular weight organic polymers and cross-linking agents, such as, polyvalent cations, have been injected into subterranean hydrocarbon-bearing formations. These injected fluids predominantly finger or channel into areas of relatively high permeability wherein the high molecular weight organic polymer is crosslinked and gelled. This resultant gel plugs relatively highly permeable areas distant from the well bore and improves conformance and flow profiles of injected and/or produced fluids. U.S. Pat. No. 3,782,467 to Hessert discloses a method for plugging zones of high gas permeability contained in a hydrocarbon-bearing subterranean formation wherein fireflood production methods are utilized or where naturally occurring gas causes undesirably high gas-oil ratios. A basic pH, aqueous slug of a dissolved thickener, a reducing agent and a reducible crosslinking agent is injected into the gas permeability zone. Naturally occurring carbon dioxide, injected carbon dioxide, or carbon dioxide produced from the fireflood combustion contacts the aqueous slug in situ, lowering the pH of the aqueous slug and activating the responsive reducing agent. A myriad of thickening agents, crosslinking agents, and reducing agents may be employed in practice of U.S. Pat. No. 3,782,467, including partially hydrolyzed polyacrylamide, sodium bisulfite, and alkali metal dichromates (e.g., chromium), respectively. U.S. Pat. No. 3,785,437 to Clampitt, et al, relates to a method of inhibiting the production of undesirable fluids from a subterranean producing formation. Fluid permeability is reduced by injecting into the formation a first aqueous composition containing a crosslinkable polymer and one of the oxidizing or reducing components of a redox catalyst system, and a second aqueous composition containing the other component of redox catalyst system. The oxidizing component of the redox catalyst system is a polyvalent metal which is capable of being reduced to a lower polyvalent state, for example, an alkali metal dichromate, such as sodium dichromate. The hexavalent chromium present in sodium dichromate is reduced in situ to trivalent chromium by a suitable reducing agent. An example of a suitable reducing component is sodium bisulfite. Examples of a crosslinkable polymer suitable for use in U.S. Pat. No. 3,785,437 are polyacrylamides and related polymers, cellulose ethers, and polysaccharides.

U.S. Pat. No. 3,958,638 to Johnston discloses a method for altering the permeability of a subterranean hydrocarbon-containing formation wherein an aqueous solution of a crosslinkable polymer is injected into the formation along with an encapsulated gelation agent. The encapsulating material melts upon contact with the temperature of the subterranean environment to release the encapsulated gelation agent thereby gelling the polymer. An aqueous polymer, such as a polyacrylamide may be utilized with both a reducing agent, such as, sodium bisulfite, and a polyvalent metal capable of being reduced to a lower valence state, i.e., an oxidizing agent, for example, an alkali metal dichromate.

However, the effectiveness of all of these prior art processes is significantly reduced by a common problem. When dry commercial polymers, such as, partially hydrolyzed polyacrylamides, are incorporated into an aqueous medium to formulate a solution for injection, crosslinking of the polymer can occur due to ester linkages and/or anhydride bridges generated within the polymer during drying thereof, metal ion impurities present in the dried polymer and/or components present within water utilized to formulate treating solutions. Continued injection of a solution containing crosslinked polymers into a subterranean hydrocarbon-bearing formation will result in face plugging of the well bore injection surface and increase injection pressure or decrease injection rate thereby ultimately necessitating cleaning operations prior to continued injection.

Thus, a need exists for a process for selectively reducing the permeability of a subterranean formation in which dry commercial polymers can be effectively employed.

DISCLOSURE OF INVENTION

The present invention provides a process for selectively reducing the permeability of a subterranean formation while intermittently cleaning a subterranean injection surface plugged with a crosslinked dry polymer. An aqueous solution containing an oxidizing agent is injected into a well bore penetrating and in fluid communication with the formation. The oxidizing agent reacts with the crosslinked polymer to clean the injection surface while concomitantly providing a cationic crosslinking agent for subsequent reaction in the formation. An aqueous spacer medium is injected via the well bore to flush the products of such reaction, including the cationic crosslinking agent, into the formation. Subsequently, injection into the formation of an aqueous solution having a dry polymer dissolved therein is continued. The polymer is crosslinked in situ by the cationic crosslinking agent to form a plugging gel.

BEST MODE FOR CARRYING OUT THE INVENTION

The present invention relates to a process for removing a significant portion of a face plug formed on an injection surface of a well bore penetrating a subterranean hydrocarbon-bearing formation and for selectively reducing the permeability of the subterranean hydrocarbon-bearing formation.

The process of the present invention is particularly applicable where an aqueous solution of a dry polymer containing organically crosslinked dry polymer is injected into a subterranean formation via a well and gradually forms a face plug over an injection surface. The resultant face plug increases injection pressure and reduces injection rate. As utilized throughout this description, the term "injection surface" denotes any subterranean surface, e.g., a well bore or fracture, from which treating fluid injected via a well enters a subterranean formation. As also utilized throughout this description, the term "dry polymer" refers to any of the commercially available synthetic or naturally derived, water soluble resins and polymers which undergo a final drying step during commercial processing causing at least partial reaction of organic functions therein which results in crosslinking of the polymer due to, inter alia, ester linkages and anhydride bridges. Crosslinking of these dry polymers may also be caused by metallic ions, such as, alkaline earth metal ions or trivalent ions, contained in impurities present in the dry commercial polymer, present in water used to formulate aqueous solutions thereof, or present in well bore fluids. Exemplary of such dry polymers are polyacrylamides, partially hydrolyzed polyacrylamides, cellulose ethers, polyacrylonitrile, polyvinylpyrrolidone, lignosulfonates, polysaccharides, for example, heteropolysaccharides produced by action of bacteria of the genus Xanthomonas on sugars and/or starches, and/or mixtures thereof.

It is preferred to utilize a partially hydrolyzed polyacrylamide in the practice of the present invention. The degree of hydrolysis of or substitution with carboxylate functions present in the partially hydrolyzed polyacrylamide can vary from about 5% to about 50%, more preferably from about 10% to about 40%, and most preferably from about 15% to about 30%. The molecular weight of dry polymers employed in accordance with the present invention may range from about 100,000 to about 20,000,000, more preferably from about 1,000,000 to about 10,000,000, and most preferably from about 3,000,000 to about 6,000,000.

The aqueous solution of a dry polymer can be employed as the initial step of the process of the present invention or may be employed in an entirely different process. For example, an aqueous solution of a dry polymer, such as, a polyacrylamide, can be utilized as a thickened slug to drive formation hydrocarbons to a production well during secondary or tertiary recovery operations. As previously discussed, the dry polymer will crosslink either prior to injection or in the well bore, and thus, face plug the injection surface of the well bore, i.e., that section of the well bore directly communicating via perforations with the subterranean formation, and/or fractures in the subterranean formation which communicate with the well bore.

In accordance with the process of the present invention, once the crosslinked dry polymer has formed an appreciable face plug within the well bore, injection of the aqueous polymer solution is ceased and an aqueous acidic solution of an oxidizing agent is injected into the well bore. Appreciable face plugging is indicated when an appreciable pressure build-up, e.g., an injection pressure increase of about 25% and up, occurs at a constant injection rate. The oxidizing agent reacts with insoluble organic matter present in the face plug and well bore fluids to oxidize the organic matter to lower molecular weight compounds resulting in dissolution of the face plug. Concomitant with such oxidation, a polyvalent metal present in the oxidizing compound is reduced to a lower valence state crosslinking agent. The oxidizing agent may be permanganate, chromate, or dichromate salts and/or mixtures thereof. Examples of permanganate, chromate and/or dichromate salts suitable for practice of the present invention are those of lithium, sodium, potassium and ammonium. It is preferred to employ the salts of sodium and potassium. If chromate or dichromate salts are employed, hexavalent chromium is reduced in situ to trivalent chromium upon reaction with the organic matter. If permanganate compounds are employed, manganese is reduced from a $+7$ valence to a $+4$ valance. It is important to note that the lower molecular weight compounds produced from the reaction of the oxidizing agent with insoluble organic matter present in the face plug or well bore fluids will not be crosslinked to gels by the concomitantly formed cationic crosslinking agent.

The aqueous solution containing the oxidizing agent preferably has an acidic pH of from about 2 to 6, more preferably from about 2 to about 4, and most preferably about 3. The solution can be rendered acidic by the addition of a mineral acid, such as, hydrochloric acid or sulfuric acid, or a low molecular weight organic acid, such as, acetic acid or oxalic acid.

The aqueous solution having an oxidizing agent dissolved therein can be either injected continuously or allowed to statically soak within the well bore for a period of time, although the latter mode of injection is preferably employed. The exact contact time and/or the concentration of oxidizing agent in the aqueous solution can be varied to achieve the desired dissolution of the face plug, as will be evident to the skilled artisan. A soak period of several hours to several days, e.g. 1 to 7 days may be employed.

Once the aqueous solution containing the oxidizing agent has been injected into the well bore and permitted to react with the face plug, an aqueous, spacer medium is injected into the subterranean formation via the well bore to flush the reaction products produced from the reaction of the oxidizing agent with organic matter into formation. The aqueous medium can be fresh water or brine, although the latter must contain only insignificant quantities of alkaline earth metals and ferric containing compounds, as will be evident to the skilled artisan.

Thereafter, an aqueous solution having a dry polymer dissolved therein is injected into the subterranean formation. The relatively highly aqueous polymer containing solution breaks through the low viscosity aqueous spacer medium within the subterranean formation permitting the polymer to be crosslinked by the reduced polyvalent metal ions resulting in a plugging gel. As fluids injected into or produced from the subterranean formation via a well bore penetrating the same preferentially flow through areas of relatively high permeability, the gel will be preferentially formed in these areas of relatively high permeability, and thus, will improve vertical conformance and flow profiles of fluids subsequently injected into or produced from the formation. Upon the occurrence of either injection of the total amount of aqueous polymer solution or significant loss of injection pressure, injection of the aqueous polymer containing solution is terminated. Sequential injection of the aqueous solution containing the oxidizing agent, aqueous spacer medium, and aqueous polymer containing solution can be repeated until the degree of permeability reduction desired is achieved.

The aqueous polymer containing solution of the present invention preferably contains an antioxidant to protect the polymer from oxidation due to residual oxidant present in the well bore upon initial injection thereof. Once the aqueous polymer-containing solution breaks through the aqueous spacer medium, the antioxidant further serves to promote complete conversion of the polyvalent metal contained in the previously injected oxidant to a crosslinking agent, thus increasing the efficiency of the process. Examples of antioxidants suitable for use in the present invention are sodium sulfite, sodium hydrosulfite, sodium metabisulfite, potassium sulfite, sodium bisulfite, potassium metabisulfite, sodium thiosulfate, ferrous sulfate, thioacetamide, hydroquinine, ferrous chloride, p-hydrazinobenzoic acid, hydrazine phosphite and hydrazine dichloride. It is preferred to utilize sodium bisulfite as the antioxidant.

The concentration of dry polymer employed in the aqueous polymer-containing solution of the present invention can be from about 50 ppm to about 50,000 ppm, more preferably from about 500 ppm to about 10,000 ppm, and most preferably from about 1,000 ppm to about 5,000 ppm. The oxidizing agent can be incorporated into an aqueous solution employed in accordance with the present invention in an amount of from about 1 wt% to about 20 wt%, and more preferably from about 5 wt% to about 10 wt%. The amount of antioxidant employed in the aqueous polymer-containing solution of the present invention is always less than the amount stoichiometrically required to reduce the polyvalent metal present in the aqueous solution containing the oxidizing agent since the antioxidant is not solely employed in the process of the present invention to reduce the polyvalent metal to a crosslinking agent.

The preferred molecular function ratio of cationic crosslinking agent to anionic function present in the dry polymer is about 1 to 3. For example, employing a weight ratio of about 1 part sodium dichromate, less than 1 part sodium bisulfite, and about 3 to about 5 parts of about 3,000 to about 10,000 ppm of a 20 to 30% hydrolyzed, partially hydrolyzed polyacrylamide will result in firm gels. Substantially similar ratios will result in firm gels when carboxymethyl cellulose, carboxymethyl hydroxyethyl cellulose or Xanthan heteropolysaccharides are employed as the dry polymer in accordance with the present invention. For optimum gel strength, the weight ratio will vary with the exact polymer employed, the degree of polymer hydrolysis, the degree of polymer substitution, the aqueous medium used to formulate solutions, the reagent grades, and formation parameters, and can be readily determined by the skilled artisan. The volumes of solutions injected in accordance with the present invention are selected to obtain the concentration ranges and ratios aforedescribed upon mixing of solutions in situ, as evident to the skilled artisan.

The following example is illustrative of the application of the process of the present invention and is not to be construed as limiting the scope thereof.

EXAMPLE 1

A 5 wt% aqueous solution of partially hydrolyzed polyacrylamide (PHPA) having about 30 percent of the carboxamide groups hydrolyzed to carboxylate groups is diluted with a brine having a constituency concentration of 18,600 ppm NaCl, 3,820 ppm $MgCl_2$, 3,070 ppm $Na_2SO_4$ and 875 ppm $CaCl_2$. About 10 ppm sodium bisulfite and 300 ppm sodium azide are incorporated into the resultant aqueous solution containing about 10,000 ppm PHPA.

The injection surface of a well bore penetrating and communicating with a subterranean hydrocarbon-bearing formation is initially cleaned of organic matter by injecting into the well bore two formation well bore volumes, i.e. the well bore volume over the formation thickness, of an aqueous solution of 5 wt% sodium dichromate previously acidified to a pH of about 3 by the addition of hydrochloric acid. The solution is allowed to soak for 24 hours. The trivalent chromium resulting from oxidation of the organic matter is flushed into the formation by injection of several formation well bore volumes of brine having a constituency concentration as previously described. About 500 barrels of the aqueous PHPA solution formulated as previously described is thereafter injected in the formation. Formation of a substantial face plug is indicated by substantial loss of injectability at a constant injection pressure. Subsequently, two additional formation well bore volumes of 5 wt% sodium dichromate solution are injected into the formation via the well bore and allowed to soak for 24 hours. Approximately 2500 bbl/day of total fluid (about 100 formation well bore volumes) is injected into the formation for 4 days over a pressure range of about 500 to about 1000 psig. The permeability reduction achieved by this sequential injection treatment should be sufficiently large to significantly improve vertical and areal conformance and flow profiles of fluids subsequently injected into or produced from the formation via the well bore.

A biocide, for example, sodium azide or formaldehyde, may be incorporated into the aqueous polymer-containing solution of the present invention in an amount from about 10 ppm to about 300 ppm. It is important to note that as utilized in the practice of the present invention, chromate and bisulfite reagents also function as biocides. Additionally, since the oxidants of the present invention will oxidize organic matter from the injection surface at increased rates with increased temperatures, the aqueous solution containing an oxidant may be heated prior to injection by any suitable means, as will be evident to the skilled artisan, or alternatively, may be heated by means of a conventional downhole heater.

Preferably, the process of the present invention is utilized to treat the environment near the injection surface, i.e., the volume of a subterranean formation surrounding the injection surface which, as a general guide, usually extends a distance into the subterranean formation of up to about 10 feet from the injection surface. The environment near the injection surface may extend up to about 30 ft. or more.

Although throughout this description, the process of the present invention has been described as involving the use of aqueous solution of dry polymers, the present invention is equally applicable with aqueous solutions containing polymers formed in solution and not isolated. Such polymers can be crosslinked by metallic ions and impurities, as previously described with respect to dry polymers, and thus, ultimately form a face plug over an injection surface.

While the foregoing preferred embodiment of the invention has been described and shown, it is understood that all alternatives and modifications, such as those suggested, and others may be made thereto, and fall within the scope of the invention.

We claim:

1. A process for selectively reducing the permeability of a subterranean formation penetrated by a well bore in fluid communication therewith wherein an aqueous solution having a dry polymer dissolved therein is injected into the formation via the well bore until a face plug forms over an injection surface thereby significantly reducing the injectability of the aqueous solution, the process comprising:
   (a) injecting into the well bore an aqueous acidic solution having an oxidizing agent dissolved therein, said oxidizing agent reacting with organic matter contained in said face plug to form lower molecular weight organic compounds causing dissolution of at least a significant portion of said face plug, polyvalent metals present in the oxidizing agent concomitantly being reduced to a lower valence state;
   (b) injecting an aqueous spacer medium into the formation via the well bore to transport said lower molecular weight compounds and said reduced polyvalent metals into the formation; and
   (c) injecting an aqueous solution having a dry polymer dissolved therein into the formation via the well bore, said dry polymer being crosslinked by said reduced polyvalent metals to form a plugging gel preferentially and predominantly within areas of the formation having relatively high permeabilities thereby improving vertical conformance and flow profiles of fluids subsequently injected into or produced from the formation.

2. The process of claim 1 wherein said oxidizing agent is a permanganate, chromate or dichromate salt, or mixtures thereof.

3. The process of claim 1 wherein said oxidizing agent is sodium dichromate.

4. The process of claim 1 wherein said oxidizing agent is potassium permanganate.

5. The process of claim 1 wherein the pH of said aqueous acidic solution is from about 2 to about 6.

6. The process of claim 1 wherein the pH of said aqueous acidic solution is about 3.

7. The process of claim 1 wherein said aqueous spacer medium is fresh water.

8. The process of claim 1 wherein said dry polymer is a polyacrylamide, a polysaccharide, a cellulose ether, or mixtures thereof.

9. The process of claim 8 wherein said dry polymer is a polyacrylamide in which from about 5% to about 50% of the carboxylate functions are hydrolyzed.

10. The process of claim 1 wherein said aqueous solution containing a dry polymer has an antioxidant dissolved therein.

11. The process of claim 1 wherein said antioxidant is sodium bisulfite.

12. The process of claim 1 wherein steps (a), (b) and (c) are repeated at least once.

13. The process of claim 1 wherein the subterranean formation is a hydrocarbon-bearing formation.

14. The process of claim 1 wherein said aqueous acidic solution having an oxidizing agent dissolved therein is allowed statically to soak within said well bore.

* * * * *